US012696150B2

(12) United States Patent
Cheng et al.

(10) Patent No.: US 12,696,150 B2
(45) Date of Patent: Jul. 28, 2026

(54) COMMUNICATION METHOD AND COMMUNICATION APPARATUS

(71) Applicant: HUAWEI TECHNOLOGIES CO., LTD., Shenzhen (CN)

(72) Inventors: Yan Cheng, Shanghai (CN); Limin Xia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 18/432,201

(22) Filed: Feb. 5, 2024

(65) Prior Publication Data

US 2024/0224139 A1 Jul. 4, 2024

Related U.S. Application Data

(63) Continuation of application No. PCT/CN2022/089265, filed on Apr. 26, 2022.

(30) Foreign Application Priority Data

Aug. 10, 2021 (CN) .......................... 202110915844.9

(51) Int. Cl.
*H04W 36/00* (2009.01)
*H04W 36/08* (2009.01)

(52) U.S. Cl.
CPC ... *H04W 36/008357* (2023.05); *H04W 36/08* (2013.01)

(58) Field of Classification Search
CPC ......... H04W 36/008357; H04W 36/08; H04W 8/24; H04W 36/0069; H04W 36/0072
USPC ....................................... 455/436
See application file for complete search history.

(56) References Cited

U.S. PATENT DOCUMENTS

| | | | | |
|---|---|---|---|---|
| 11,968,633 B2 * | 4/2024 | Luo | ....................... | H04L 5/0053 |
| 12,010,735 B2 * | 6/2024 | Da Silva | ........... | H04W 74/0866 |
| 2011/0103348 A1 * | 5/2011 | Hori | .................. | H04W 36/0055 |
| | | | | 370/331 |
| 2020/0128453 A1 * | 4/2020 | Teyeb | ............... | H04W 36/0094 |
| 2021/0153278 A1 * | 5/2021 | Van Der Velde | ............................. | |
| | | | | H04W 28/0215 |
| 2021/0282098 A1 * | 9/2021 | Luo | ....................... | H04L 5/0053 |
| 2021/0385706 A1 * | 12/2021 | Xu | ................... | H04W 36/00698 |

(Continued)

FOREIGN PATENT DOCUMENTS

| | | | | | |
|---|---|---|---|---|---|
| CN | 110267301 A | * | 9/2019 | ........ | H04W 36/0011 |
| CN | 112702768 A | * | 4/2021 | ........ | H04W 36/0027 |
| CN | 115136692 A | * | 9/2022 | ............. | H04W 8/24 |

(Continued)

OTHER PUBLICATIONS

Xu, Xian-feng; CN-110267301-A, A Double-connecting System In Terminal Capability Acquiring Method, 2019-09-20, All pages and figures (Year: 2019).*

*Primary Examiner* — Mahendra R Patel

(74) *Attorney, Agent, or Firm* — Maier & Maier, PLLC

(57) ABSTRACT

In a handover process, a source base station can send information about a band combination to a target base station (such as a master base station). The band combination includes a band of the target base station and a band of a secondary base station. After receiving the information about the band combination, the target base station can add the secondary base station in the handover process or add the secondary base station immediately after the handover is completed.

10 Claims, 7 Drawing Sheets

(56)                References Cited

U.S. PATENT DOCUMENTS

2022/0117021 A1*    4/2022  Chung  .................. H04W 76/16
2024/0064719 A1*    2/2024  Min  ..................... H04W 16/10

FOREIGN PATENT DOCUMENTS

EP              3592099  B1  *   4/2023    ............ H04W 76/18
WO      WO-2021088006  A1  *   5/2021    ........ H04W 52/0232
WO      WO-2022081060  A1  *   4/2022    ............ H04W 76/16
WO      WO-2023010355  A1  *   2/2023    ............ H04W 72/04

* cited by examiner

Core network element 31
(5GC)

NG

NG-U

Xn

MN 01
(eNB)

SN 11
(gNB)

Core network element 31
(5GC)

NG

NG-U

Xn

MN 01
(gNB)

SN 11
(eNB)

COMMUNICATION METHOD AND COMMUNICATION APPARATUS

CROSS-REFERENCE TO RELATED APPLICATIONS

This application is a continuation of International Application No. PCT/CN2022/089265, filed on Apr. 26, 2022, which claims priority to Chinese Patent Application No. 202110915844.9, filed on Aug. 10, 2021. The disclosures of the aforementioned applications are incorporated herein by reference in these entireties.

TECHNICAL FIELD

The embodiments relate to the field of communication technologies and to a communication method and apparatus.

BACKGROUND

Continuous development of communication technologies and diversity of communication services bring an increasing amount of user service data and an increasingly high requirement for a network speed. To satisfy user requirements, operators keep improving capabilities of network devices and network solutions, to increase a user data transmission rate.

After a terminal establishes communication with a base station, the terminal may be handed over from the current base station to a target base station due to reasons of coverage, load, a service, or the like, for example, the terminal moves to a cell coverage edge and signals become weak, or load of a current serving cell of the terminal is heavy and load of a neighboring cell is lighter. However, after the terminal is handed over to the target base station, a radio resource throughput of the target base station possibly cannot meet a requirement of the terminal, and consequently, better experience cannot be provided for a user.

SUMMARY

Embodiments provide a communication method and apparatus, and a system, so that after a terminal is handed over to a target base station, a proper secondary station can be quickly added, thereby increasing a radio resource throughput and reducing measuring time.

According to a first aspect, an embodiment provides a communication method. The method includes:

A second base station receives a first message from a first base station in a process in which a terminal is handed over from the first base station to the second base station. The first message indicates a band combination, and the band combination includes a band of the second base station and a band of a third base station.

The second base station adds the third base station as a secondary base station, where the second base station is a master base station.

In a handover process, a source base station sends information about a band combination to a target base station (such as a master base station). The band combination includes a band of the target base station and a band of a secondary base station. After receiving the information about the band combination, the target base station may add the secondary base station in the handover process or add the secondary base station immediately after the handover is completed. According to this solution, a delay of measurement performed by the terminal after the terminal is handed over to the target base station is saved, so that dual connectivity can be quickly performed after the handover. In addition, the band combination is selected by the master base station for the terminal, so that transmission performance of the terminal can be ensured.

In the method in the first aspect, optionally, the band combination is determined by the second base station.

In the method in the first aspect, optionally, the method further includes:

The second base station receives, from the first base station, information about one or more candidate band combinations. The information about the candidate band combinations includes at least two bands and signal quality of cells corresponding to the at least two bands.

The second base station determines the band combination from the one or more candidate band combinations, where the one or more candidate band combinations include the band combination.

The second base station sends indication information (the indication information indicates the band combination) of the band combination to the first base station.

In the method in the first aspect, optionally, the band combination is determined by the first base station.

In the method in the first aspect, optionally, the method further includes:

The second base station sends information about the second base station to the first base station. The information about the second base station includes one or more of load, an available resource, a transmission rate, a carrier aggregation (CA) capability, and an interference status.

In the method in the first aspect, optionally, the method further includes:

The second base station receives, from the first base station, information about one or more candidate band combinations. The information about the candidate band combinations includes at least two bands and signal quality of cells corresponding to the at least two bands, and the at least two bands include the band of the second base station.

In the method in the first aspect, optionally, the method further includes:

The second base station receives a request from the first base station, where the request is for requesting the information about the second base station.

In the method in the first aspect, optionally, that the second base station adds the third base station as a secondary base station includes:

The second base station adds the third base station as the secondary base station in the handover process.

In the method in the first aspect, optionally, that the second base station adds the third base station as a secondary base station includes:

The second base station adds the third base station as the secondary base station after the handover is completed.

In the method in the first aspect, optionally, standards of the first base station and the second base station are different.

In the method in the first aspect, optionally, the standards of the first base station and the second base station are the same.

In the method in the first aspect, optionally, the second base station receives the first message from the first base station via a core network, or the second base station receives the first message from the first base station through an interface between the second base station and the first base station.

According to a second aspect, an embodiment provides a communication method. The method includes:

A first base station determines a first message in a process in which a terminal is handed over from the first base station to a second base station. The first message indicates a band combination, and the band combination includes a band of the second base station and a band of a third base station.

The first base station sends the first message to the second base station.

Both the second base station and the third base station are connected to the terminal.

In the method in the second aspect, optionally, the band combination is determined by the second base station.

In the method in the second aspect, optionally, the method further includes:

The first base station sends information about one or more candidate band combinations to the second base station. The information about the candidate band combinations includes at least two bands and signal quality of cells corresponding to the at least two bands. The candidate band combinations are for determining the band combination, and the one or more candidate band combinations include the band combination.

The first base station receives, from the second base station, indication information (the indication information indicates the band combination) of the band combination.

In the method in the second aspect, optionally, the band combination is determined by the first base station.

In the method in the second aspect, optionally, the method further includes:

The first base station receives information about the second base station from the second base station. The information about the second base station includes one or more of load, an available resource, a transmission rate, a carrier aggregation (CA) capability, and an interference status.

The first base station determines the band combination based on the information about the second base station.

In the method in the second aspect, optionally, the method further includes:

The first base station sends information about a candidate band combination to the first base station. The information about the candidate band combination includes at least two bands and signal quality of cells corresponding to the at least two bands, and the at least two bands include the band of the second base station.

In the method in the second aspect, optionally, the method further includes:

The first base station sends a request to the second base station, where the request is for requesting the information about the second base station.

In the method in the second aspect, optionally, the method further includes:

The first base station sends a capability query message to the terminal.

In response to the capability query message, the first base station receives a band combination supported by the terminal from the terminal, where the band combination supported by the terminal includes the band combination indicated by the first message.

In the method in the second aspect, optionally, the method further includes:

The first base station sends a capability query message to the terminal.

In response to the capability query message, the first base station receives a band combination supported by the terminal from the terminal, where the band combination supported by the terminal includes one or more candidate band combinations.

According to a third aspect, an embodiment provides a communication apparatus. The communication apparatus may be used in a base station or a chip in a base station. The communication apparatus includes a memory and a processor. The memory is configured to store a computer program, and the processor is configured to invoke the computer program from the memory and run the computer program, so that the method in the first aspect or the second aspect is performed.

According to a fourth aspect, an embodiment provides a computer storage medium. The computer storage medium stores a program configured to implement the method in the first aspect or the second aspect. When the program is run in a wireless communication apparatus, the wireless communication apparatus is enabled to perform the method in the first aspect or the second aspect.

According to a fifth aspect, an embodiment provides a computer program product. The program product includes a program, and when the program is run, the method in the first aspect or the second aspect is performed.

According to a sixth aspect, an embodiment provides a communication system. The communication system includes a second base station configured to perform the method in the first aspect and a first base station configured to perform the method in the second aspect.

DETAILED DESCRIPTION OF EMBODIMENTS

The following describes solutions of embodiments with reference to the accompanying drawings.

Figure 1:
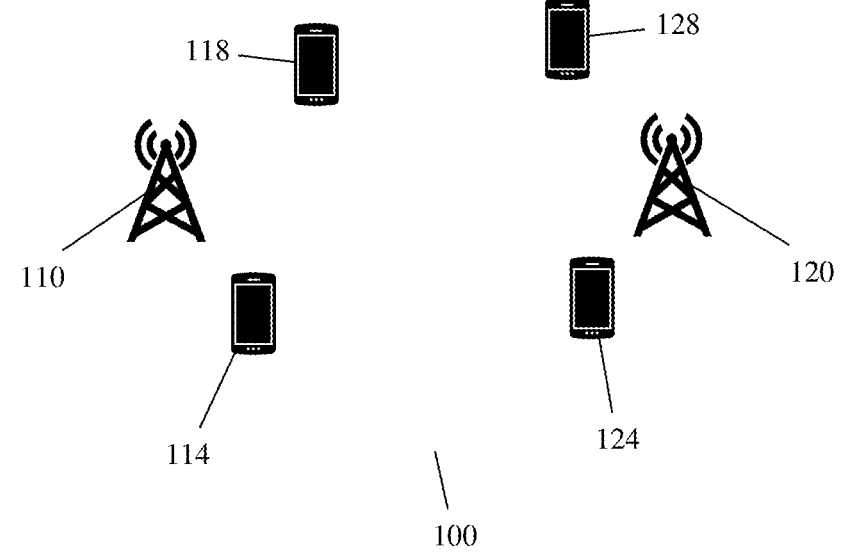
FIG. 1 is a schematic diagram of a structure of a communication system.

The solutions in embodiments are applicable to a communication system shown in FIG. 1.

A method provided in embodiments may be applied to a communication system and an apparatus provided in embodiments may be used in the communication system. FIG. 1 is a schematic diagram of a structure of a communication system. A communication system 100 includes one or more network devices (a network device 110 and a network device 120 are shown in the figure), and one or more terminals that communicate with the one or more network devices. A terminal 114 and a terminal 118 shown in FIG. 1 communicate with the network device 110, and a terminal 124 and a terminal 128 shown in FIG. 1 communicate with the network device 120. It may be understood that the network device and the terminal may also be referred to as communication devices.

The technologies described in embodiments may be applied to various communication systems, for example, a 4th generation (4G) communication system, a 4.5th generation (4.5G) communication system, a 5th generation (5G) communication system, a system integrating a plurality of communication systems, or a future evolved communication system, for example, a 6G (6G) communication system. For example, the communication system may be a long term evolution (LTE) system, a new radio (NR) system, a wireless-fidelity (Wi-Fi) system, a wireless self-organizing system, a device-to-device direct communication system, a communication system related to a 3rd generation partnership project (3GPP), another communication system of this type, or the like.

Figure 2:
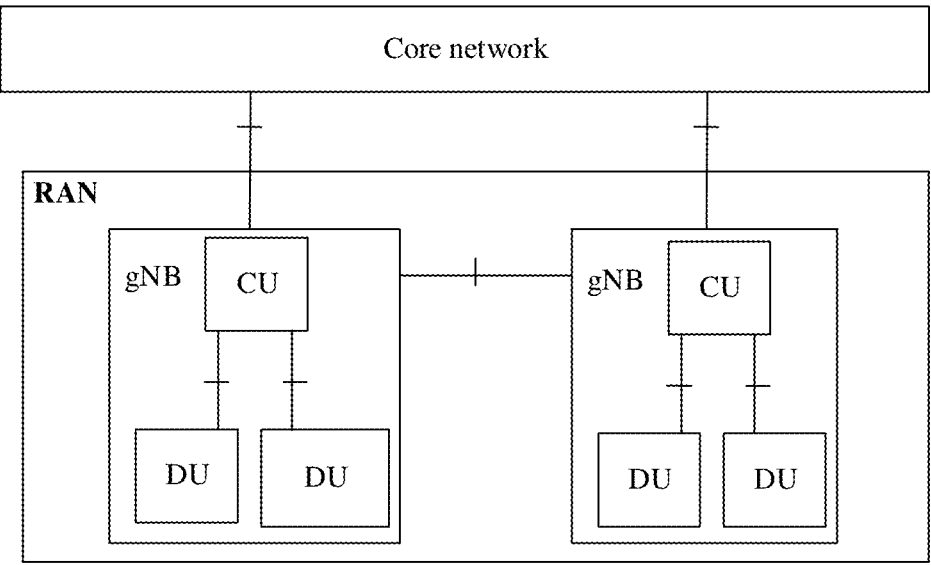
FIG. 2 is a schematic diagram of a possible architecture of a communication system.

FIG. 2 is a schematic diagram of a possible architecture of a communication system. As shown in FIG. 2, a network device in a radio access network (RAN) includes a base station (for example, a gNodeB or a gNB) with an architecture in which a central unit (CU) and a distributed unit (DU) are separated. The RAN may be connected to a core network (for example, the core network may be an LTE core network or a 5G core network). It may be understood that a base station is divided into the CU and the DU from the perspective of a logical function. The CU and the DU may be physically separated or deployed together. A plurality of DUs may share one CU. One DU may alternatively be connected to a plurality of CUs (not shown in the figure). The CU and the DU may be connected through an interface, for example, an F1 interface.

The CU and the DU may be obtained through division based on protocol layers of a wireless network. For example, functions of a packet data convergence protocol (PDCP) layer and a radio resource control (RRC) layer are set on the CU, but functions of a radio link control (RLC) layer, a media access control (MAC) layer, and a physical layer are set on the DU. It may be understood that, division of processing functions of the CU and the DU based on the protocol layers is merely an example, or there may be other division manners. For example, the CU or the DU may have functions of more protocol layers through division. For example, the CU or the DU may alternatively have some processing functions of the protocol layers through division. In an implementation, some functions of the RLC layer and functions of protocol layers above the RLC layer are set on the CU, and remaining functions of the RLC layer and functions of protocol layers below the RLC layer are set on the DU. In another implementation, functions of the CU or the DU may alternatively be divided based on a service type or another system requirement. For example, division is performed based on a delay, a function whose processing time needs to satisfy a delay requirement is set on the DU, and a function whose processing time does not need to satisfy the delay requirement is set on the CU. In an implementation, the CU may alternatively have one or more functions of the core network. One or more CUs may be disposed in a centralized manner or a separate manner. For example, the CUs may be disposed on a network side for ease of centralized management.

The network architecture shown in FIG. 2 may be applied to a 5G communication system, and the 5G communication system may share one or more components or resources with an LTE system.

The functions of the CU may be implemented by one entity, or a control plane (CP) and a user plane (UP) of the CU may be separated. For example, the control plane of the CU (CU-CP) and the user plane of the CU (CU-UP) may be implemented by different function entities, and the CU-CP and the CU-UP may be coupled to the DU to jointly implement a function of the base station.

The functions of the DU may be implemented by one entity or a plurality of entities. The DU may have a plurality of radio frequency functions, or the radio frequency functions may be disposed remotely.

The functions of the wireless protocol layers that are set on the DU may be further divided based on division of the protocol layers. For example, a radio frequency function and a function of a lower layer of the physical layer are set on a radio unit (RU), and functions of the RLC layer, the MAC layer, and a higher layer of the physical layer are set on the DU.

For ease of distinguishing and description, the lower layer and the higher layer are referred in the embodiments. The lower layer of the physical layer can implement a part of functions of the physical layer, and the higher layer of the physical layer can implement the other part of functions of the physical layer.

For example, on a downlink, one or more of inverse fast Fourier transformation (IFFT) and digital beamforming may be performed on the lower layer of the physical layer. One or more of resource (RE) mapping, precoding, layer mapping, modulation, scrambling, rate matching, and coding may be performed on the higher layer of the physical layer. Alternatively, one or more of inverse fast Fourier transformation, digital beamforming, resource mapping, and precoding may be performed on the lower layer of the physical layer. One or more of layer mapping, modulation, scrambling, rate matching, and coding may be performed on the higher layer of the physical layer. Alternatively, on the downlink, one or more of inverse fast Fourier transformation, digital beamforming, resource mapping, precoding, layer mapping, and modulation may be performed on the lower layer of the physical layer. One or more of scrambling, rate matching, and coding may be performed on the higher layer of the physical layer.

On an uplink, one or more of fast Fourier transformation (FFT) and digital beamforming may be performed on the lower layer of the physical layer. Resource demapping, channel estimation, equalization, inverse discrete Fourier transformation (IDFT), demodulation, descrambling, rate dematching, and decoding may be performed on the higher layer of the physical layer. Alternatively, one or more of fast Fourier transformation, digital beamforming, resource demapping, channel estimation, and equalization may be performed on the lower layer of the physical layer. One or more of inverse discrete Fourier transformation, demodulation, descrambling, rate dematching, and decoding may be performed on the higher layer of the physical layer.

It may be understood that the lower layer of the physical layer and the higher layer of the physical layer are examples of division of the physical layer, and there may be another division manner. "Lower" in "lower layer" and "higher" in "higher layer" are not for limitation. "Lower layer" and "higher layer" may be replaced with other names.

It may be understood that embodiments are applicable to an architecture in which the CU and the DU are not separated, or are applicable to an architecture in which the CU and the DU are separated. When being applicable to the architecture in which the CU and the DU are separated, embodiments provided in the embodiments are applicable to an architecture in which the CU-CP and the CU-UP are separated, and/or the DU and the RU are separated.

In the embodiments, a network device may be any device that has a wireless transceiver function. The network device includes, but is not limited to: an evolved NodeB (NodeB or eNB or e-NodeB) in LTE, a base station (gNodeB or gNB) or a transmission receiving point (transmission receiving point/transmission reception point, TRP) in NR, a subsequent evolved base station in 3GPP, an access node in a Wi-Fi system, a wireless relay node, a wireless backhaul node, a core network device, or the like. A base station may be a macro base station, a micro base station, a picocell base station, a small cell, a relay station, a balloon station, or the like. A plurality of base stations may support the foregoing networks using a same technology, or may support the foregoing networks using different technologies. The base station may include one or more co-site or non-co-site TRPs. The network device may alternatively be a server (for example, a cloud server), a radio controller in a cloud radio access network (CRAN) scenario, a CU, and/or a DU. The network device may alternatively be a server, a wearable device, a machine communication device, a vehicle-mounted device, a smart screen, or the like. An example in which the network device is a base station is used for description below. The plurality of network devices may be base stations of a same type, or may be base stations of different types. The base station may communicate with a terminal device, or may communicate with the terminal device via a relay station. The terminal device may communicate with a plurality of base stations using different technologies. For example, the terminal device may communicate with a base station supporting an LTE network, or may communicate with a base station supporting a 5G network, or may support dual connectivity to the base station in the LTE network and the base station in the 5G network.

It may be understood that all or a part of functions of the network device in the embodiments may alternatively be implemented by using a software function running on hardware, or may be implemented by using an instantiated virtualization function on a platform (for example, a cloud platform).

A terminal is a device that has a wireless transceiver function. The terminal may be deployed on land, including indoors or outdoors, or may be hand-held, wearable, or vehicle-mounted; may be deployed on water (for example, on a ship); or may be deployed in the air (for example, on an airplane, a balloon, or a satellite). The terminal may be a mobile phone, a pad, a computer that has a wireless transceiver function, a virtual reality (VR) terminal device, an AR terminal device, a mixed reality (MR) terminal device, a terminal in industrial control, a vehicle-mounted terminal device, a terminal in self driving, a terminal in assisted driving, a terminal in telemedicine, a terminal in a smart grid, a terminal in transportation safety, a terminal in a smart city, a terminal in a smart home, or the like. An application scenario is not limited in embodiments. Sometimes, the terminal may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a wireless communication device, a machine terminal, a UE agent, a UE apparatus, or the like. The terminal may be fixed or movable.

By way of example but not limitation, the terminal in the embodiments may be a wearable device. The wearable device may also be referred to as a wearable smart device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. In a board sense, wearable smart devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In the embodiments, the terminal may be a terminal in an internet of things (IOT) system. An IoT is an important component in development of future information technologies. A feature of the IoT is to connect an object to a network by using a communication technology, to implement an intelligent network of human-machine interconnection and thing-thing interconnection. The terminal in the embodiments may be a terminal in machine type communication (MTC). The terminal in the embodiments may be a vehicle-mounted module, vehicle-mounted module group, vehicle-mounted component, vehicle-mounted chip, or vehicle-mounted unit that is disposed in a vehicle as one or more components or units. The vehicle may implement the method in the embodiments by using the vehicle-mounted module, vehicle-mounted module group, vehicle-mounted component, vehicle-mounted chip, or vehicle-mounted unit that is disposed in the vehicle. Therefore, embodiments may be applied to an internet of vehicles, for example, vehicle to everything (V2X), long term evolution vehicle (LTE-V), and vehicle to vehicle (V2V).

In the communication system shown in FIG. 1, one terminal may be served by one network device. For example, if a terminal is served by a 5G base station, this scenario may be referred to as a standalone (SA) scenario. Alternatively, one terminal may be served by more than two network devices, and this scenario may be referred to as dual connectivity. For example, if a terminal is served by both a 4G base station and a 5G base station, where the 4G base station is a master base station, and the 5G base station is a secondary base station, this scenario may be referred to as a non-standalone (NSA) scenario.

Figure 3:
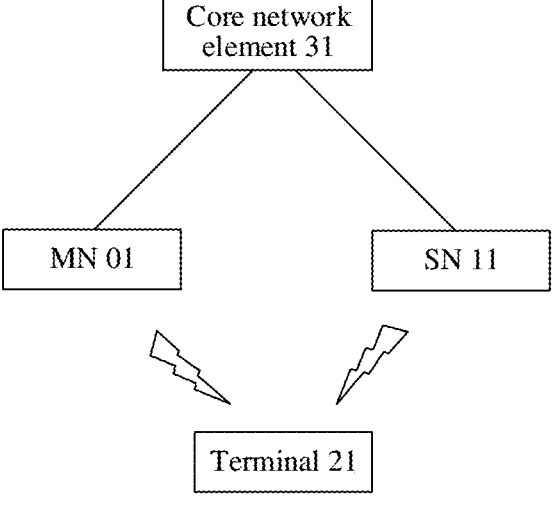
FIG. 3 is a schematic diagram of a dual connectivity communication system.

FIG. 3 is a schematic diagram of a dual connectivity communication system. A terminal 21 may simultaneously communicate with a master node (MN) 01 and a secondary node (SN) 11. The MN 01 and the SN 11 may be connected, and both the master node A and the secondary node B may be connected to a core network element 31. The MN 01 and the SN 11 may use different access technologies.

MR-DC may include the following scenarios.

1. Evolved universal terrestrial radio access (E-UTRA) and new radio (NR) dual connectivity (EN-DC), which may be also referred to as NSA.

Figure 4A:
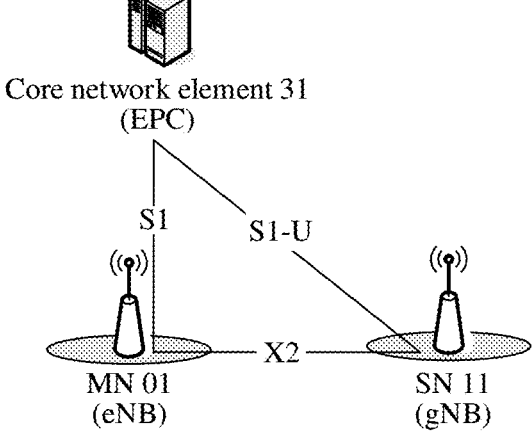
FIG. 4A is a schematic diagram of EN-DC.

FIG. 4A is a schematic diagram of the EN-DC. As shown in FIG. 4A, the core network element 31 is an evolved packet core (EPC), the MN 01 is an evolved node (eNB), and the SN 11 is a new radio node (gNB).

The MN 01 may be connected to the SN 11 through an X2 interface, and there may be a user plane connection between the MN 01 and the SN 11. The MN 01 may be connected to the core network element 31 through an S1 interface, and there may be a user plane connection between the MN 01 and the core network element 31. The SN 11 may be connected to the core network element 31 through an S1-U interface, and there may be a user plane connection between the SN 11 and the core network element 31.

2. Next generation (NG) radio access network (RAN) E-UTRA and NR dual connectivity (NGEN-DC)

Figure 4B:
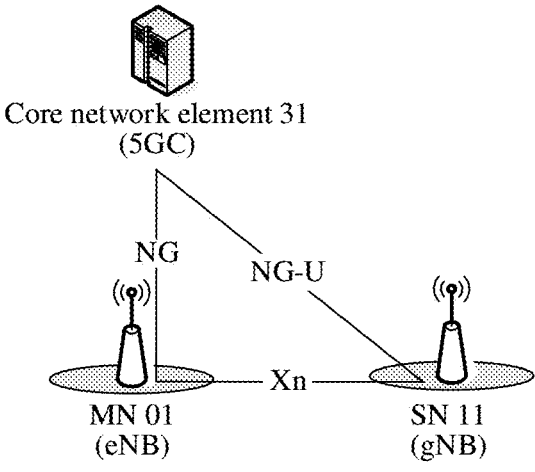
FIG. 4B is a schematic diagram of NGEN-DC.

FIG. 4B is a schematic diagram of the NGEN-DC. As shown in FIG. 4B, the core network element 31 is a 5th generation (5G) core (5GC), the MN 01 is an eNB, and the SN 11 is a gNB.

The MN 01 may be connected to the SN 11 through an Xn interface, and there may be a user plane connection between the MN 01 and the SN 11. The MN 01 may be connected to the core network element 31 through an NG interface, and there may be a user plane connection between the MN 01 and the core network element 31. The SN 11 may be connected to the core network element 31 through an NG-U interface, and there may be a user plane connection between the SN 11 and the core network element 31.

3. NR and E-UTRA dual connectivity (NG-DC)

Figure 4C:
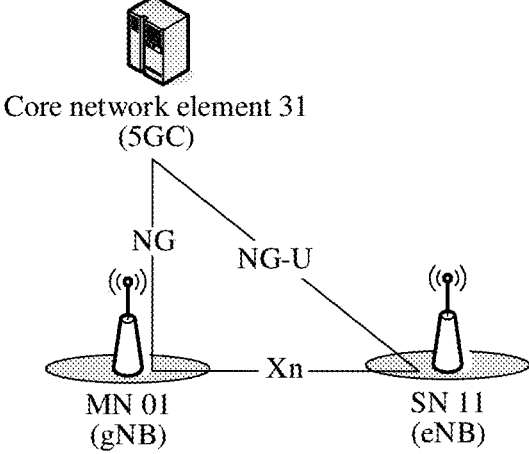
FIG. 4C is a schematic diagram of NG-DC.

FIG. 4C is a schematic diagram of the NG-DC. As shown in FIG. 4C, the core network element 31 is a 5GC, the MN 01 is a gNB, and the SN 11 is an eNB.

The MN 01 may be connected to the SN 11 through, for example, an Xn interface, and there may be a user plane connection between the MN 01 and the SN 11. The MN 01 may be connected to the core network element 31 through, for example, an NG interface, and there may be a user plane connection between the MN 01 and the core network element 31. The SN 11 may be connected to the core network element 31 through, for example, an NG-U interface, and there may be a user plane connection between the SN 11 and the core network element 31.

It should be noted that the core network element, the MN, the SN, and the terminal that are included in the communication systems shown in FIG. 4A to FIG. 4C are merely examples, and a connection relationship between the core network element and the MN or the SN is also merely an example. In embodiments, types and a quantity of network elements included in the communication system and a connection relationship between the network elements are not limited thereto.

One or both of the MN 01 and the SN 11 in FIG. 4A to FIG. 4C may use the architecture in which the CU and the DU are separated. When both the MN 01 and the SN 11 use the architecture in which the CU and the DU are separated, a CU of the MN 01 may be connected to a CU of the SN 11.

In the communication systems in FIG. 1, FIG. 3, and FIG. 4A to FIG. 4C, after the terminal accesses a network (for example, may access the network in an SA mode or an NSA mode), the terminal may be handed over due to an air interface capability, a service requirement, or the like, to achieve an objective of optimizing user experience or user distribution in the network.

Figure 4D:
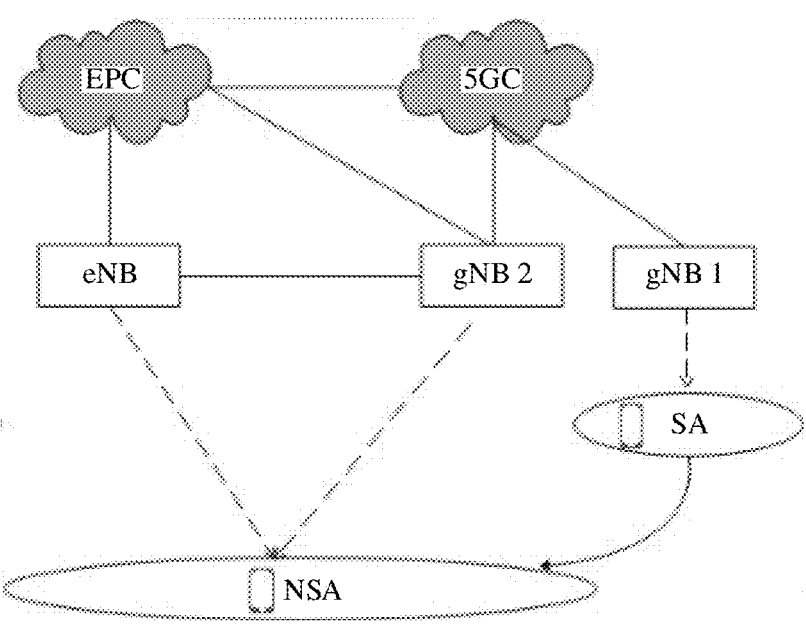
FIG. 4D is a schematic diagram of switching from an SA mode to an NSA mode.

FIG. 4D is a schematic diagram of switching from the SA mode to the NSA mode. As shown in FIG. 4D, when the terminal is in the SA mode, the terminal communicates with a gNB 1, and the gNB 1 is connected to a 5GC. When the terminal is in the NSA mode, the terminal is connected to an eNB and a gNB 2, the eNB is connected to the EPC (for example, through an S1 interface), the gNB 2 is also connected to the EPC (for example, through an S1-U interface), the gNB 2 is connected to the 5GC (for example, through an NG interface), the eNB may be connected to the gNB 2 (for example, through an X2 interface), and the EPC may be connected to the 5GC (for example, through an N26 interface). FIG. 4D is merely an example. A quantity of network elements, names, connection relationships, and names of interfaces in FIG. 4D are not limited.

In FIG. 4D, when the terminal is in the SA mode, a control plane is established on the gNB and the 5GC. When the terminal is in the NSA mode, the control plane is established on the eNB. In other words, when switching from the SA mode to the NSA mode, the terminal needs to be handed over between systems.

After the terminal is handed over from a source base station (for example, the gNB 1 in FIG. 4D) to a target base station (for example, the eNB in FIG. 4D), the target base station may determine to establish dual connectivity for the terminal. In other words, the target base station serves as a master base station and adds a secondary base station (for example, the gNB 2 in FIG. 4D) for the terminal. Both the master base station and the secondary base station keep connecting to the terminal, to increase a radio resource throughput.

For selection of the secondary base station, in one manner, after the terminal is handed over to the target base station (such as the master base station), the master base station indicates the terminal to perform measurement, and the terminal reports a measurement result to the master base station. Then the terminal selects a secondary base station based on the measurement result, and then a procedure of adding the secondary base station is performed. However, in this manner, after the terminal is handed over to the target base station, the terminal further needs to perform a measurement process. As a result, a delay is high, and transmission performance of the terminal is affected. In another manner, in a process in which the terminal is handed over to the target base station, the target base station may blindly configure the secondary base station, and perform a procedure of adding the secondary base station. In this way, after the terminal is successfully handed over to the target base station, the terminal can quickly communicate with the secondary base station. However, because the secondary base station is blindly configured, the terminal may not be well served due to signal quality, a resource, or the like of the secondary base station. As a result, transmission performance of the terminal deteriorates.

Based on the foregoing reasons, the embodiments provide a solution. In a handover process, the source base station sends information about a band combination to the target base station (such as the master base station). The band combination includes a band of the target base station and a band of the secondary base station. After receiving the information about the band combination, the target base station may add the secondary base station in the handover process or add the secondary base station immediately after the handover is completed. According to this solution, a delay of measurement performed by the terminal after the terminal is handed over to the target base station is saved, so that dual connectivity can be quickly performed after the handover. In addition, the band combination is selected by the master base station for the terminal, so that the transmission performance of the terminal can be ensured.

The following describes the foregoing solution with reference to the accompanying drawings.

Figure 5:
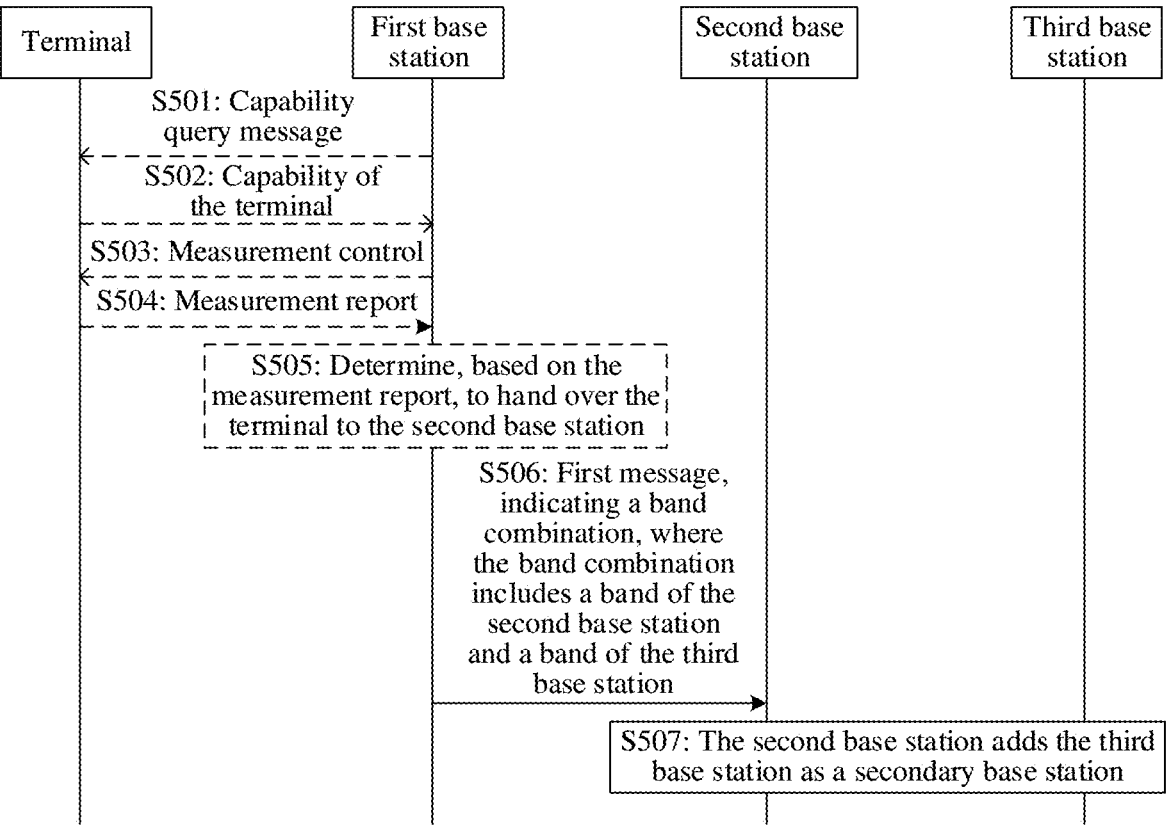
FIG. 5 is a schematic diagram of a communication method.

FIG. 5 is a schematic diagram of a communication method according to an embodiment. In the method corresponding to FIG. 5, a terminal is handed over from a first base station to a second base station, and then the second base station and a third base station establish dual connectivity for the terminal. Optionally, when the terminal is served by the first base station, the terminal may communicate with only the first base station, or may communicate with a base station other than the first base station. In other words, the terminal may be in a dual connectivity state before being handed over. A standard of the first base station may be the same as or different from a standard of the second base station, and the standard of the second base station may be the same as or different from a standard of the third base station. For example, the first base station may be a 5G base station, the second base station may be a 4G base station, and the third base station may be a 5G base station. As shown in FIG. 5, the method includes the following steps.

S501: The first base station sends a capability query message to the terminal.

Optionally, the first base station may determine, based on a service condition, that the terminal needs to be handed over to the second base station, and then sends the capability query message. For example, the service condition may be user experience or network adjustment. For example, signal quality of the first base station is poor, or a voice service is not supported.

Alternatively, optionally, the first base station may send the capability query message to the terminal not based on the service condition.

S502: The terminal feeds back a capability of the terminal to the first base station.

After receiving the capability query message, the terminal may feed back the capability of the terminal.

Optionally, the capability of the terminal includes one or more of the following: (1) whether the terminal is directly switched to a dual connectivity state, and (2) a band combination supported by the terminal.

That the terminal is directly switched to the dual connectivity state in (1) may be understood as that dual connectivity is established in a handover process, for example a secondary base station is added for the terminal in the handover process. If the terminal does not support the capability (1), it indicates that adding the secondary base station for the terminal in the handover process is not supported by the terminal, and the secondary base station is added for the terminal only after the terminal is successfully handed over to the target base station.

The band combination supported by the terminal in (2) indicates bands of one or more carries that the terminal can simultaneously communicate with. For example, if the terminal supports to simultaneously communicate with one or more of a carrier 1, a carrier 2, and a carrier 3, a band combination 1 of the terminal may indicate a band of the carrier 1, a band of the carrier 2, and a band of the carrier 3.

That the terminal simultaneously communicates with one or more carriers may be understood as intra-base station carrier aggregation and/or inter-base station carrier aggregation, or may be understood as dual connectivity or multi-connectivity. The one or more carriers may belong to a same base station, or separately belong to different base stations. Alternatively, a part of a plurality of carriers belong to a same base station, and other carriers belong to different base stations.

The band may be understood as a frequency range, for example, from 2300 Hz to 2500 Hz. A band may be represented by using an index. For example, the band of the carrier 1 may be represented as 1, the band of the carrier 2 may be represented as 2, and the band of the carrier 3 may be represented as 3.

The band combination may include an index of a band. For example, the band combination 1 includes 1, 2, and 3. A relationship between a band and an index of the band may be preconfigured on the first base station and the terminal, so that information about the band does not need to be included when the band combination includes the index, to reduce signaling overheads.

The band combination may also be referred to as an NSA combination or an EN-DC combination. This is not limited in this embodiment.

Both S501 and S502 are optional. For example, S501 may not exist, and only S502 exists, or S501 and S502 do not exist.

S503: The first base station sends measurement control to the terminal to indicate the terminal to measure signals of one or more cells.

Optionally, the first base station may determine, based on a network configuration and the band combination that is supported by the terminal and that is reported by the terminal in S502, the one or more cells to be measured. For example, the first base station may select a band combination supported by a network from the band combination supported by the terminal, that is, select a band combination supported by both the terminal and the network, and then indicate the terminal to measure a cell corresponding to a band indicated by the band combination.

S504: The terminal sends a measurement report to the first base station.

The measurement report includes a measurement result of the one or more cells, and the measurement result of the one or more cells includes signal quality of the one or more cells.

S505: The first base station determines, based on the measurement report, to hand over the terminal to the second base station.

S505 is optional.

S506: The first base station sends a first message to the second base station. The first message indicates a band combination, where the band combination includes a band of the second base station and a band of the third base station.

Optionally, the first message may further include an identifier of a cell corresponding to the band of the second base station, and an identifier of a cell corresponding to the band of the third base station.

Optionally, the first message may be a handover request message, and the band combination may be implemented by using an existing information element in the handover request message, or may be implemented by using a newly added information element.

Optionally, the band combination may further indicate one or more other bands. This is not limited in this embodiment.

For how to determine the band combination, this embodiment provides the following manners.

In a first implementation, the band combination is determined by the second base station.

In the first implementation, the method in FIG. 5 further includes: the second base station receives, from the first base station, information about one or more candidate band combinations. The information about the candidate band combinations includes at least two bands and signal quality of cells corresponding to the at least two bands. The second base station determines the band combination from the one or more candidate band combinations, and then the second base station sends the band combination to the first base station.

Optionally, the first base station may determine the one or more candidate band combinations based on the measurement result reported by the terminal. For example, the first base station may delete a band combination with poor signal quality, and determine a band combination with good signal quality as the one or more candidate band combinations.

Optionally, the second base station may select a band combination from the one or more candidate band combinations based on a status of a resource of the second base station and the information about the candidate band combinations. The resource of the second base station may include one or more of load, an available resource, a transmission rate, a carrier aggregation (CA) capability, and an interference status.

Optionally, the load may include a user quantity, a physical resource block (PRB) utilization rate, or a control channel utilization rate.

In the foregoing first implementation, in a process in which the terminal is handed over from the first base station to the second base station, the second base station selects the proper band combination for the terminal, to help the terminal access the proper second base station and the proper third base station, and increase a throughput of the terminal after the terminal is handed over.

In a second implementation, the band combination is determined by the first base station.

Optionally, in the second implementation, the method in FIG. 5 further includes: the second base station sends information about the second base station to the first base station. The information about the second base station includes one or more of load, an available resource, a transmission rate, a carrier aggregation (CA) capability, and an interference status. Then the first base station may determine the band combination based on the received information about the second base station and the measurement result reported by the terminal.

Optionally, in the second implementation, the method in FIG. 5 further includes: the second base station receives, from the first base station, information about one or more candidate band combinations. The information about the candidate band combinations includes at least two bands and signal quality of cells corresponding to the at least two bands, and the at least two bands include the band of the second base station. The second base station may send the information about the second base station to the first base station in response to the information about the one or more candidate band combinations.

Optionally, in the second implementation, the method in FIG. 5 further includes: the second base station receives a request from the first base station, where the request is for requesting the information about the second base station. The second base station sends the information about the second base station to the first base station in response to the request.

Optionally, the request may include the information about the one or more candidate band combinations.

For example, the request may be carried in an experience evaluation assistance request message. The information about the second base station may be carried in an experience evaluation assistance request response message.

In the foregoing second implementation, in a process in which the terminal is handed over from the first base station to the second base station, the first base station selects the ideal band combination for the terminal, to help increase a throughput of the terminal after the terminal is handed over, and improve user experience.

Optionally, in the first implementation and the second implementation, interaction between the first base station and the second base station may be implemented through a 3rd generation partnership project (3GPP) standard interface or a vendor private interface. This is not limited in this embodiment.

Optionally, in addition to the foregoing two implementations, the band combination may alternatively be determined by one or more of the first base station, the second base station, and another network element. This is not limited.

S507: The second base station adds the third base station as the secondary base station.

Optionally, the third base station may be same as the first base station, or may be different from the first base station.

Optionally, the second base station may add the third base station as the secondary base station based on the identifier of the cell corresponding to the band of the third base station.

S507 may include: the second base station sends a secondary base station addition request message to the third base station, and the third base station sends a secondary base station addition request response message to the second base station.

Optionally, the band combination may further indicate a carrier of the first base station, so that the terminal may establish the dual connectivity to the second base station and the third base station, and may further implement carrier aggregation between two carriers of the first base station.

Optionally, S507 may occur in the handover process. For example, the terminal supports being directly switched to the dual connectivity state, and the second base station may add the second base station as the secondary base station in the handover process.

Optionally, S507 may occur after the handover is completed. For example, the terminal does not support being directly switched to the dual connectivity state, and the second base station may add the second base station as the secondary base station after the handover is completed.

In this embodiment, the handover process includes a process in which the first base station determines to perform handover and the terminal successfully accesses the second base station. That the handover is completed may be understood that the terminal successfully accesses the second base station.

Optionally, the method shown in FIG. 5 may be applied to handover that is based on an interface between base stations. It may be understood that message exchange between the first base station and the second base station may be performed through an interface between the first base station and the second base station. For example, in S506, the first base station may send the first message to the second base station through the interface.

Alternatively, optionally, the method shown in FIG. 5 may be applied to handover that is based on an interface between a base station and a core network. It may be understood that message exchange between the first base station and the second base station may be performed through an interface between the first base station and the core network, and an interface between the core network and the second base station. For example, in S506, the first base station may send the first message to the core network, and then the core network sends the first message to the second base station.

Figure 6:
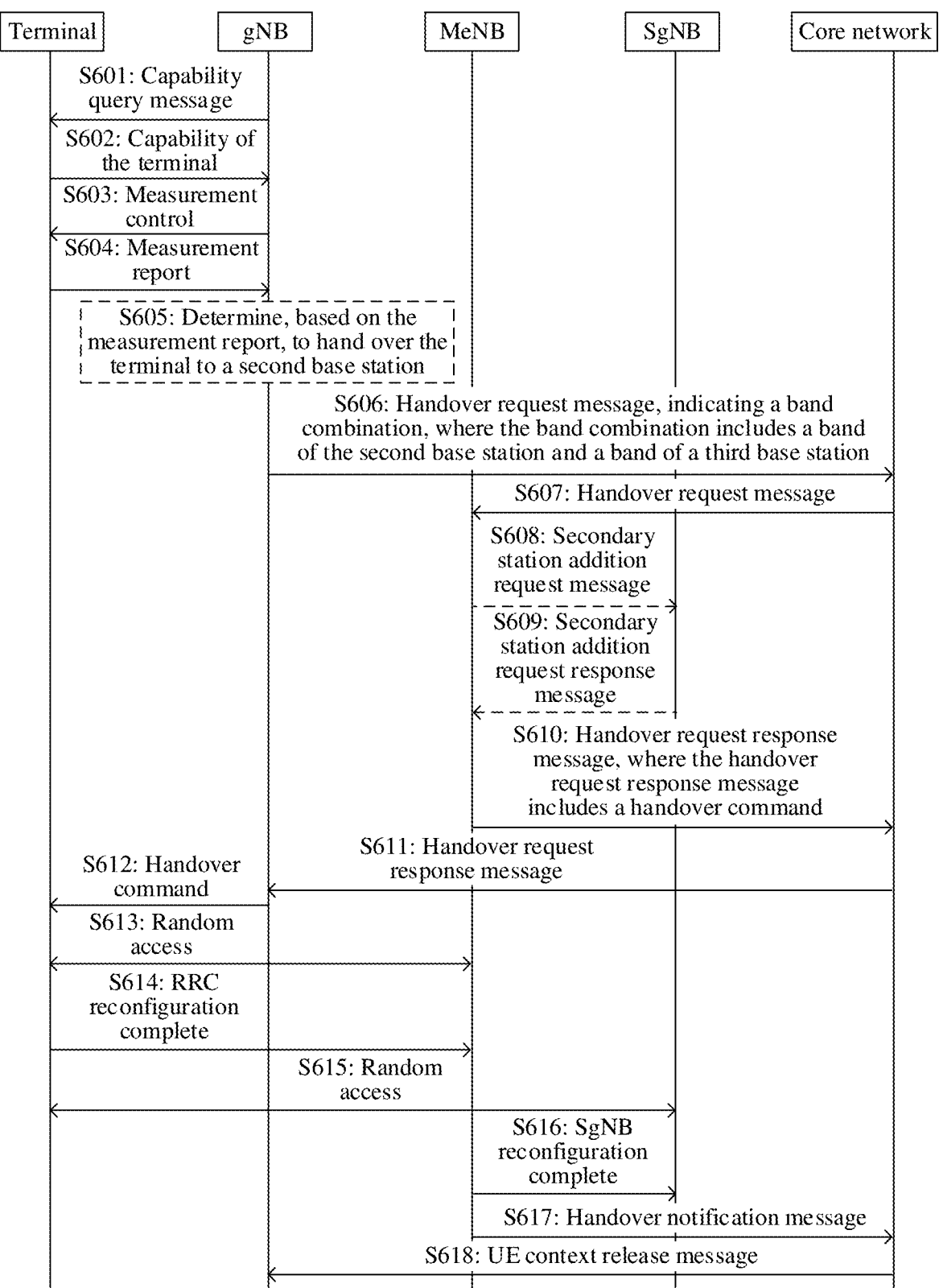
FIG. 6 is a schematic diagram of another communication method.
Figure 7:
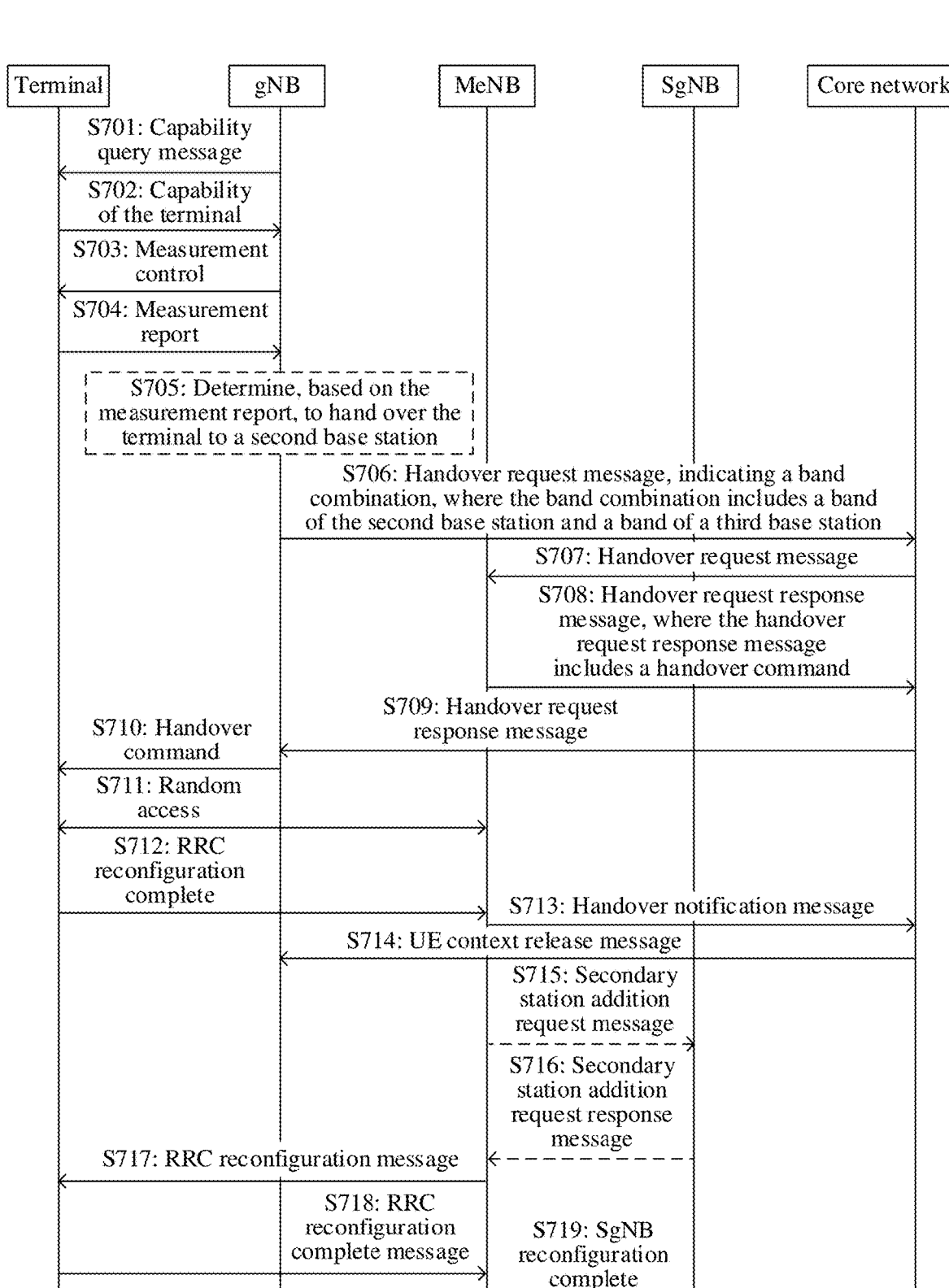
FIG. 7 is a schematic diagram of another communication method.

The following further describes the method in FIG. 5 with reference to FIG. 6 and FIG. 7.

FIG. 6 is a schematic diagram of another communication method according to an embodiment. The method in FIG. 6 and the method in FIG. 5 may be mutually referenced. For example, a gNB in FIG. 6 is the first base station in FIG. 5, a master eNB (MeNB) in FIG. 6 may be the second base station in FIG. 5, a secondary gNB (SgNB) in FIG. 6 may be the third base station in FIG. 5, and a core network in FIG. 6 may be the core network in FIG. 5. The core network may include one or more core network elements, for example, the core network may include a network element in a 5GC and/or a network element in an EPC.

As shown in FIG. 6, the method includes the following steps.

S601: The gNB sends a capability query message to a terminal.

For details, refer to content of S501.

S602: The terminal feeds back a capability of the terminal to the gNB.

For details, refer to content of S502. It should be noted that the terminal in FIG. 6 supports being directly switched to the dual connectivity state.

S603: The gNB sends measurement control to the terminal to indicate the terminal to measure signals of one or more cells.

For details, refer to content of S503.

S604: The terminal sends a measurement report to the gNB.

For details, refer to content of S504.

S605: The gNB determines, based on the measurement report, to hand over the terminal to the MeNB.

For details, refer to content of S505.

S606: The gNB sends a handover request message to the core network. The handover request message indicates a band combination, where the band combination includes a band of the second base station and a band of the third base station.

Optionally, the band combination may be determined by the gNB, or may be determined by the eNB. For details, refer to content of S506.

S607: The core network sends the handover request message to the MeNB.

S606 and S607 may be understood as that the gNB sends the handover request message to the MeNB via the core network. For details, refer to content of S506.

S608: The MeNB sends a secondary station addition request message to the SgNB.

S609: The SgNB sends a secondary station addition request response message to the MeNB.

S610: The MeNB sends a handover request response message to the core network, where the handover request response message includes a handover command.

S611: The core network sends the handover request response message to the gNB.

S612: The gNB sends the handover command to the terminal.

S613: The terminal performs random access to the MeNB.

S614: The terminal sends an RRC reconfiguration complete message to the MeNB.

S615: The terminal performs random access to the SgNB.

S616: The MeNB sends a SgNB reconfiguration complete message to the SgNB.

A sequence of S615 and S616 is not limited, and S616 may occur before S615.

S617: The MeNB sends a handover notification (handover notify) message to the core network.

S618. The core network sends a UE context release message to the gNB.

According to the method in FIG. 6, the terminal may perform measurement before the terminal is handed over, and then a secondary station is added in a handover process, so that a delay of measurement, addition, and access of the secondary station is reduced, to quickly add the secondary station. In addition, the first base station or the second base station determines the band combination used by the terminal after the terminal is handed over, to select the band combination more accurately, so as to achieve an effect expected before the handover and improve transmission performance of the terminal.

FIG. 7 shows another communication method according to an embodiment. The method in FIG. 7 and the method in FIG. 5 may be mutually referenced. For example, a gNB in FIG. 7 is the first base station in FIG. 5, a master eNB (master eNodeB, MeNB) in FIG. 7 may be the second base station in FIG. 5, a secondary gNB (secondary gNodeB, SgNB) in FIG. 7 may be the third base station in FIG. 5, and a core network in FIG. 7 may be the core network in FIG. 5. The core network may include one or more core network elements, for example, the core network may include a network element in a 5GC and/or a network element in an EPC.

As shown in FIG. 7, the method includes the following steps.

S701: The gNB sends a capability query message to a terminal.

For details, refer to content of S501.

S702: The terminal feeds back a capability of the terminal to the gNB.

For details, refer to content of S502. It should be noted that the terminal in FIG. 7 does not support being directly switched to the dual connectivity state.

S703: The gNB sends measurement control to the terminal to indicate the terminal to measure signals of one or more cells.

For details, refer to content of S503.

S704: The terminal sends a measurement report to the gNB.

For details, refer to content of S504.

S705: The gNB determines, based on the measurement report, to hand over the terminal to the MeNB.

For details, refer to content of S505.

S706: The gNB sends a handover request message to the core network. A first message indicates a band combination, where the band combination includes a band of the second base station and a band of the third base station.

S707: The core network sends the handover request message to the MeNB.

S706 and S707 may be understood as that the gNB sends the handover request message to the MeNB via the core network. For details, refer to content of S506.

S708: The MeNB sends a handover request response message to the core network, where the handover request response message includes a handover command.

S709: The core network sends the handover request response message to the gNB.

S710: The gNB sends the handover command to the terminal.

S711: The terminal performs random access to the MeNB.

S712: The terminal sends an RRC reconfiguration complete message to the MeNB.

S713: The MeNB sends a handover notification (handover notify) message to the core network.

S714. The core network sends a UE context release message to the gNB.

S715: The MeNB sends a secondary station addition request message to the SgNB.

S716: The SgNB sends a secondary station addition request response message to the MeNB.

S715 and S716 may occur before S713, or between S713 and S714, or after S714. This is not limited in this embodiment.

S717: The MeNB sends an RRC reconfiguration message to the terminal.

S718: The terminal sends the RRC reconfiguration complete message to the MeNB.

S719: The MeNB sends a SgNB reconfiguration complete message to the SgNB.

S720: The terminal performs random access to the SgNB.

According to the method in FIG. 7, the terminal may perform measurement before the terminal is handed over. Then, a secondary station may be added based on the selected band combination after the terminal accesses a master base station, so that a delay of measurement, addition, and access of the secondary station is reduced, to quickly add the secondary station. In addition, the first base station or the second base station determines the band combination used by the terminal after the terminal is handed over, to select the band combination more accurately, so as to achieve an effect expected before the handover and improve transmission performance of the terminal.

Figure 8:
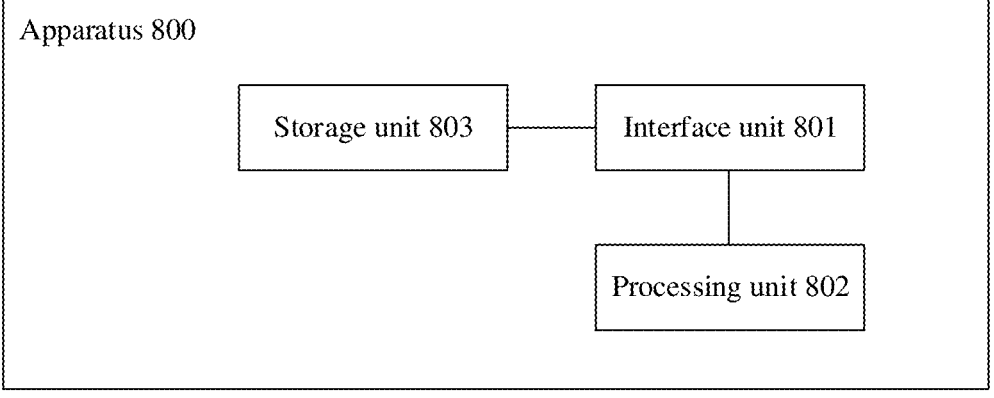
FIG. 8 is a schematic diagram of a structure of an apparatus.

FIG. 8 is a schematic diagram of a structure of an apparatus 800 according to the embodiments. The apparatus may be a base station, a server, a centralized controller, or a terminal, or may be a component (for example, an integrated circuit or a chip) of a network device, a server, a centralized controller, or a terminal. Alternatively, the apparatus may be another communication module configured to implement the methods in the method embodiments. The network device may be a network device in an architecture in which a CU and a DU are not separated, or may be a CU or a DU in an architecture in which the CU and the DU are separated, or may be a CU-CP or a CU-UP in an architecture in which CU-CP and CU-UP are separated, or may be a DU or an RU in an architecture in which the DU and the RU are separated.

The apparatus 800 may include an interface unit 801, a processing unit 802, and a storage unit 803. The interface unit 801 and the storage unit 803 are optional.

In a possible implementation, the processing unit 802 in FIG. 8 may be implemented by one or more processors. The processing unit 802 may also be referred to as a processing module, and may implement a control function.

The interface unit 801 may be implemented by one or more transceivers and/or communication interfaces. The transceiver may implement communication with a terminal, and is configured to implement a receiving and sending function. The communication interface may implement communication with another network device. Alternatively, the communication interface may be a transceiver circuit, an interface, or an interface circuit. The interface unit 801 may be referred to as a transceiver unit.

The storage unit 803 may be implemented by one or more memories.

Optionally, the modules in the apparatus 800 in this embodiment may be configured to perform one or more steps described in the methods in embodiments. For example, the processing unit is configured to perform a processing-related action. The interface unit 801 is configured to perform information receiving, information sending, or the like with a unit in the network device, or is configured to perform the information receiving, the information sending, or the like with another network device. The storage unit 803 is configured to store information received from another unit of the network device or another network device, or store information to be sent to another unit or another network device, or may store information generated by the processing unit in a processing process.

For example, the communication apparatus 800 may be the first base station in the foregoing methods, and the interface unit may send, to a second base station, a first message that indicates a band combination. The processing unit may determine the band combination, and the storage unit may store the band combination.

For another example, the communication apparatus 800 may be the second base station in the foregoing methods, and the interface unit may receive, from the second base station, a first message that indicates a band combination. The processing unit may determine the band combination, and the storage unit may store the band combination.

Figure 9:
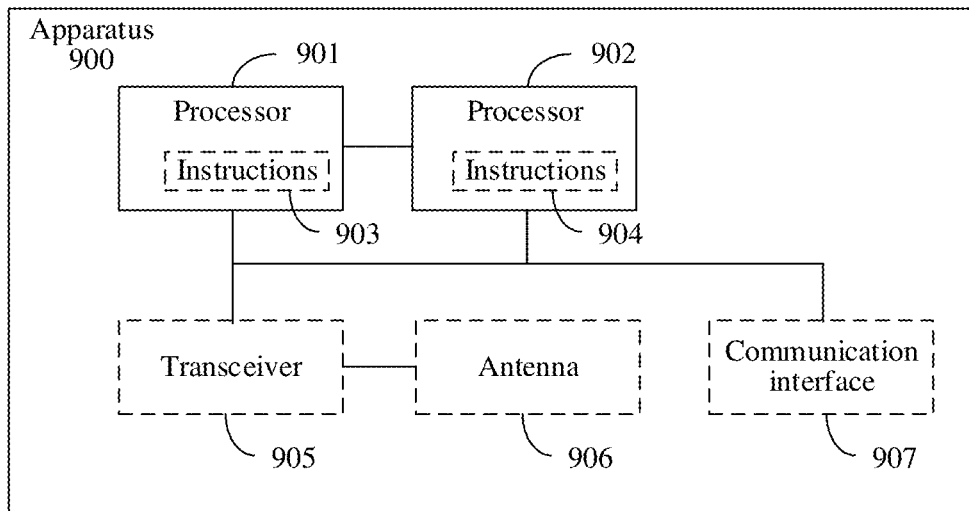
FIG. 9 is a schematic diagram of a structure of an apparatus.

FIG. 9 is a schematic diagram of a structure of an apparatus 900. The apparatus 900 may be configured to implement the methods described in the foregoing method embodiments. For details, refer to the descriptions in the foregoing method embodiments. The apparatus may be a terminal, a network device, a server, or a centralized controller, or may be a component (for example, an integrated circuit or a chip) of a network device, a server, a centralized controller, or a terminal. Alternatively, the apparatus may be another communication module configured to implement the methods in the method embodiments. The network device may be a network device in an architecture in which a CU and a DU are not separated, or may be a CU or a DU in an architecture in which the CU and the DU are separated, or may be a CU-CP or a CU-UP in an architecture in which the CU-CP and CU-UP are separated, or may be a DU or an RU in an architecture in which the DU and the RU are separated.

The apparatus 900 may include one or more processors 901. The processor 901 may also be referred to as a processing unit, and may implement a control function. The processor 901 may be a general-purpose processor, a dedicated processor, or the like. For example, the processor 901 may be a baseband processor or a central processing unit. The baseband processor may be configured to process a communication protocol and communication data. The central processing unit may be configured to control a communication apparatus (for example, a base station, a baseband chip, a DU, a CU, or an RU), execute a software program, and process data of the software program.

In an optional implementation, the processor 901 may also store instructions and/or data 903. The instructions and/or data 903 may be run by the processor, to enable the apparatus 900 to perform the methods described in the foregoing method embodiments.

In another optional implementation, the processor 901 may include an interface unit configured to implement a receiving and sending function. For example, the interface unit may be a transceiver circuit, an interface, an interface circuit, or a communication interface. The transceiver circuit, the interface, or the interface circuit configured to implement the receiving and sending function may be separated, or may be integrated together. The transceiver circuit, the interface, or the interface circuit may be configured to read and write code/data. Alternatively, the transceiver circuit, the interface, or the interface circuit may be configured for signal transmission or transferring.

Optionally, the apparatus 900 may include one or more memories 902. The memory 902 may store instructions 904. The instructions may be run on the processor, to enable the apparatus 900 to perform the methods described in the foregoing method embodiments. Optionally, the memory may alternatively store data. Optionally, the processor may alternatively store instructions and/or data. The processor and the memory may be separately disposed, or may be integrated together. For example, the correspondence described in the foregoing method embodiments may be stored in the memory or stored in the processor.

Optionally, the apparatus 900 may further include a transceiver 905 and/or an antenna 906. The transceiver 905 may be referred to as a transceiver unit, a transceiver machine, a transceiver circuit, an interface unit, a transceiver apparatus, a transceiver module, or the like, and is configured to implement a receiving and sending function, for example, a receiving and sending function with a terminal.

Optionally, the apparatus 900 may further include a communication interface. The communication interface may be configured to communicate with another communication apparatus. For example, the communication apparatus is the CU, and the CU may communicate with the DU through the communication interface.

For example, the apparatus is a base station in the architecture in which the CU and the DU are not separated, and the apparatus 900 may include a processor 901, a memory 902, a transceiver 905, an antenna 906, and a communication interface 907. The base station may perform information transmission with the terminal by using the transceiver 905 and the antenna 906. The base station may communicate with another base station or network device through the communication interface 907. For example, a first base station may communicate with a second base station through the communication interface.

For example, when the apparatus is the CU, the apparatus 900 may include a processor 901, a memory 902, and a communication interface 907. The CU may perform information transmission with the DU through the communication interface 907.

Alternatively, for example, when the apparatus is the DU (which is the DU when the DU and the RU are not separated), the communication apparatus may include a processor 901, a memory 902, a transceiver 905, an antenna 906, and a communication interface 907. The DU may perform information transmission with the terminal by using the transceiver 905 and the antenna 906, and the DU may perform information transmission with the CU through the communication interface 907. Alternatively, for example, when the apparatus is the RU in the architecture in which the DU and the RU are separated, the apparatus may include a processor 901, a memory 902, a transceiver 905, an antenna 906, and a communication interface 907. The RU may perform information transmission with the terminal by using the transceiver 905 and the antenna 906, and the RU may perform information transmission with the DU through the communication interface 907.

Alternatively, for example, when the apparatus is the DU in the architecture in which the DU and the RU are separated, the apparatus may include a processor 901, a memory 902, and a communication interface 907. The DU may perform information transmission with the RU through the communication interface 907.

It may be understood that, in some scenarios, some optional features in embodiments may be independently implemented without depending on another feature, for example, a solution on which the optional features are currently based, to resolve a corresponding problem and achieve a corresponding effect. Alternatively, in some scenarios, the optional features may be combined with other features based on requirements. Correspondingly, the apparatus provided in embodiments may also correspondingly implement these features or functions. Details are not described herein.

A person skilled in the art may further understand that various illustrative logical blocks and steps that are listed in embodiments may be implemented by using electronic hardware, computer software, or a combination thereof. Whether the functions are implemented by using hardware or software depends on particular applications and a design requirement of the entire system. A person skilled in the art may use various methods to implement the functions for a corresponding application, but it should not be considered that the implementation goes beyond the scope of the embodiments.

It may be understood that, the processor in embodiments may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

The solutions described in the embodiments may be implemented in various manners. For example, the technologies may be implemented by hardware, software, or a combination thereof. For hardware implementation, a processing unit configured to perform these technologies at a communication apparatus (for example, a base station, a terminal, a network entity, or a chip) may be implemented in one or more general-purpose processors, a DSP, a digital signal processor, an ASIC, a programmable logic device, an FPGA or another programmable logic apparatus, a discrete gate or transistor logic device, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

It may be understood that the memory in embodiments may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods includes, but is not limited to, these and any memory of another proper type.

The embodiments further provide a non-transitory computer-readable medium storing a computer program. When the computer program is executed by a computer, functions of any one of the foregoing method embodiments are implemented.

The embodiments further provide a computer program product. When the computer program product is executed by a computer, functions of any one of the foregoing method embodiments are implemented.

All or a part of the foregoing embodiments may be implemented by using software, hardware, firmware, or any combination thereof. When software is used to implement embodiments, all or a part of the foregoing embodiments may be implemented in a form of a computer program product. The computer program product includes one or more computer instructions. When the computer instructions are loaded and executed on a computer, the procedures or functions in embodiments are all or partially generated. The computer may be a general-purpose computer, a special-purpose computer, a computer network, or other programmable apparatuses. The computer instructions may be stored in a non-transitory computer-readable storage medium, or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer-readable storage medium may be any usable medium accessible by a computer, or a data storage device, such as a server or a data center, integrating one or more usable media. The usable medium may be a magnetic medium (for example, a floppy disk drive, a hard disk drive, or a magnetic tape), an optical medium (for example, a high-density digital video disc (DVD)), a semiconductor medium (for example, a solid-state drive (SSD)), or the like.

It may be understood that "an embodiment" means that particular features, structures, or characteristics related to the embodiment are included in at least one embodiment. Therefore, embodiments do not necessarily refer to a same embodiment. In addition, these particular features, structures, or characteristics may be combined in one or more embodiments in any appropriate manner. It may be understood that sequence numbers of the foregoing processes do not mean an execution sequence in various embodiments. The execution sequence of the processes should be determined based on functions and internal logic of the processes, and should not be construed as any limitation on the implementation processes of embodiments.

It should be understood that "when" and "if" mean that an apparatus performs corresponding processing in an objective situation, and are not intended to limit time. The terms do not mean that the apparatus is required to have a determining action during implementation, and do not mean any other limitation.

"Simultaneously" may be understood as being at a same time point, may be understood as being within a time period, or may be understood as being within a same periodicity.

A person skilled in the art may understand that various numerals such as first and second in the embodiments are only for distinguishing for ease of description, but are not for limiting the scope of embodiments. A specific value of a numeral (which may also be referred to as an index), a specific value of a quantity, and a position are only used as examples, but are not unique representation forms, and are not for limiting the scope of embodiments. Various numerals such as first and second are also only for distinguishing for ease of description, but are not for limiting the scope of embodiments.

In the embodiments, an element represented in a singular form is intended to indicate "one or more", but does not indicate "only one", unless otherwise specified. In the embodiments, unless otherwise specified, "at least one" is intended to indicate "one or more", and "a plurality of" is intended to indicate "two or more".

In addition, the terms "system" and "network" may be used interchangeably in the embodiments. The term "and/or" describes only an association relationship for describing associated objects and indicates that three relationships may exist. For example, A and/or B may indicate the following three cases: only A exists, both A and B exist, and only B exists. A may be singular or plural, and B may be singular or plural. The character "/" generally indicates an "or" relationship between the associated objects.

The term "at least one of" indicates all combinations or any combination of listed items. For example, "at least one of A, B, and C" may indicate the following six cases: only A exists, only B exists, only C exists, A and B coexist, B and C coexist, and A, B, and C coexist. A may be singular or plural, B may be singular or plural, and C may be singular or plural.

It may be understood that, in embodiments, "B corresponding to A" indicates that B is associated with A, and B may be determined based on A. However, it should be further understood that determining B based on A does not mean that B is determined based only on A. B may alternatively be determined based on A and/or other information.

The correspondences shown in the tables in the embodiments may be configured, or may be predefined. Values of the information in the tables are merely examples, and other values may be configured. This is not limited. When a correspondence between information and each parameter is configured, not all correspondences shown in the tables need to be configured. For example, in the tables, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in the embodiments may be understood as "define", "predefine", "store", "pre-store", "pre-negotiate", "preconfigure", "solidify", or "pre-burn".

A person of ordinary skill in the art may understand that units and algorithm steps in the examples described with reference to embodiments can be implemented by electronic hardware or a combination of computer software and electronic hardware. Whether the functions are performed by hardware or software depends on particular applications and design constraint conditions of the solutions. A person skilled in the art may use different methods to implement the described functions for each particular application, but it should not be considered that the implementation goes beyond the scope of the embodiments.

A person of ordinary skill in the art may understand that, for a purpose of convenient and brief description, for a detailed working process of the foregoing system, apparatus, and unit, refer to a corresponding process in the foregoing method embodiments. Details are not described herein again.

Functional units in embodiments may be integrated into one processing unit, or each of the units may exist alone physically, or two or more units are integrated into one unit.

When functions are implemented in the form of a software functional unit and sold or used as an independent product, the functions may be stored in a non-transitory computer-readable storage medium. Based on such an understanding, the solutions of the embodiments essentially, or the part contributing to the conventional technology, or some of the solutions may be implemented in a form of a software product. The computer software product is stored in a storage medium, and includes several instructions for instructing a computer device (which may be a personal computer, a server, or a network device) to perform all or a part of the steps of the methods described in embodiments. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely specific implementations, but are not intended to limit the scope of the embodiments. Any variation or replacement readily figured out by a person skilled in the art shall fall within the scope of the embodiments.

What is claimed is:

1. A method, comprising:
receiving, by a second base station, from a first base station, information about one or more candidate band combinations, wherein the information about the candidate band combinations comprises at least two bands and signal quality of cells corresponding to the at least two bands;
determining, by the second base station, a band combination from the one or more candidate band combinations, wherein the one or more candidate band combinations comprise the band combination;
sending, by the second base station, indication information of the band combination to the first base station;
receiving, by the second base station, a first message from the first base station in a process in which a terminal is handed over from the first base station to the second base station, wherein the first message indicates the band combination, and the band combination comprises a band of the second base station and a band of a third base station; and
adding, by the second base station, the third base station as a secondary base station, wherein the second base station is a master base station.

2. The method according to claim 1, wherein the at least two bands comprise the band of the second base station.

3. The method according to claim 1, wherein adding, by the second base station, the third base station as a secondary base station comprises:

adding, by the second base station, the third base station as the secondary base station in the handover process.

4. The method according to claim 1, wherein adding, by the second base station, the third base station as a secondary base station comprises:
adding, by the second base station, the third base station as the secondary base station after the handover is completed.

5. The method according to claim 1, wherein standards of the first base station and the second base station are different.

6. The method according to claim 1, wherein standards of the first base station and the second base station are the same.

7. An apparatus, comprising:
a processor and a memory, wherein the memory is configured to store a computer program, and the processor is configured to invoke and run the computer program stored in the memory, and the computer program instructs the processor to:
receive, from a first base station, information about one or more candidate band combinations, wherein the information about the candidate band combinations comprises at least two bands and signal quality of cells corresponding to the at least two bands;
determine, by the apparatus, a band combination from the one or more candidate band combinations, wherein the one or more candidate band combinations comprise the band combination;
send, by the apparatus, indication information of the band combination to the first base station;
receive a first message from the first base station in a process in which a terminal is handed over from the first base station to the apparatus, wherein the first message indicates the band combination, and the band combination comprises a band of the apparatus and a band of a third base station; and
add the third base station as a secondary base station, wherein the apparatus is a master base station.

8. The apparatus according to claim 7, wherein the at least two bands comprise the band of the apparatus.

9. The apparatus according to claim 7, wherein the addition of the third base station as a secondary base station by the computer program instructions to the processor comprises instructions from the computer program to the processor to:
add the third base station as the secondary base station in the handover process.

10. The apparatus according to claim 7, wherein the addition of the third base station as a secondary base station by the computer program instructions to the processor comprises instructions from the computer program to the processor to:
add the third base station as the secondary base station after the handover is completed.

* * * * *